United States Patent [19]

Ellerbe, III et al.

[11] Patent Number: 4,576,998

[45] Date of Patent: Mar. 18, 1986

[54] VINYL URETHANE COMPOSITE POLYMER CONTAINING VINYL TERMINATED URETHANE OLIGOMERS

[75] Inventors: Gilbert B. Ellerbe, III; Robert E. Hefner, Jr., both of Lake Jackson, Tex.

[73] Assignee: The Dow Chemical Company, Midland, Mich.

[21] Appl. No.: 679,440

[22] Filed: Dec. 7, 1984

[51] Int. Cl.[4] ...................... C08G 18/62; C08G 18/63; C08F 283/04

[52] U.S. Cl. .................................. 525/455; 525/920; 528/75

[58] Field of Search .................. 525/920, 455; 528/75

[56] References Cited

U.S. PATENT DOCUMENTS

| | | | |
|---|---|---|---|
| 3,297,745 | 1/1967 | Fekete et al. | 525/920 |
| 3,598,866 | 8/1971 | Nowak et al. | 260/479 |
| 4,125,487 | 11/1978 | Olstowski | 521/123 |
| 4,233,425 | 11/1980 | Tefertiller et al. | 528/75 |
| 4,246,379 | 1/1981 | Howard | 525/920 |
| 4,347,209 | 8/1982 | Suzuki | 264/250 |
| 4,367,302 | 1/1983 | Le Roy et al. | 528/75 |
| 4,374,229 | 2/1983 | Dunnavant et al. | 525/920 |
| 4,390,645 | 6/1983 | Hoffman et al. | 528/75 |
| 4,394,491 | 7/1983 | Hoffman | 528/75 |
| 4,422,996 | 12/1983 | Navin et al. | 525/920 |
| 4,439,577 | 3/1984 | O'Connor et al. | 525/920 |
| 4,503,193 | 3/1985 | Heyman | 528/75 |

FOREIGN PATENT DOCUMENTS

| | | | |
|---|---|---|---|
| 066594 | 6/1974 | Japan | 525/920 |
| 1534258 | 11/1978 | United Kingdom . | |

Primary Examiner—Herbert S. Cockeram
Attorney, Agent, or Firm—Gary C. Cohn

[57] ABSTRACT

Vinyl urethane composite polymers are prepared by reacting a vinyl monomer, a polyahl, and a polyisocyanate in the presence of a vinyl-terminated urethane oligomer in specified proportions. The oligomer provides significantly improved impact strength and elongation to the composite. The composite is useful in preparing molded materials such as furniture and machine components.

12 Claims, No Drawings

VINYL URETHANE COMPOSITE POLYMER CONTAINING VINYL TERMINATED URETHANE OLIGOMERS

BACKGROUND OF THE INVENTION

This invention relates to vinyl urethane composite polymers, more particularly to vinyl urethane composite polymers having improved impact strength.

Vinyl urethane composite polymers are known and disclosed in U.S. Pat. Nos. 4,098,733 and 4,125,487. These composites are prepared by the simultaneous polymerization of vinyl monomers and polyurethane-forming reactants in which the heat of reaction of the polyurethane-forming reactants initiates the polymerization of the vinyl monomers. Such composites exhibit advantages such as rapid curing and good tensile properties. Unfortunately, however the impact strength and elongation of these composites are not as good as desired for some applications.

It would be desirable to provide a vinyl urethane composite polymer having improved impact strength and elongation properties, and which also largely retains the beneficial properties of previously known vinyl urethane composites.

SUMMARY OF THE INVENTION

This invention is a vinyl-urethane composite polymer which comprises a reaction product of a reaction mixture comprising (a) a polyahl, (b) a polyisocyanate, (c) a vinyl monomer which has a boiling point above the temperature incurred in reacting said reaction mixture and (d) a vinyl-terminated urethane oligomer containing at least one segment derived from a poly(alkylene oxide) polyol having an equivalent weight from about 200–4000. These reactants are reacted in the presence of catalysts for the free radical polymerization of said vinyl monomer and for the polymerization of the polyurethane-forming reactants (i.e. those containing isocyanate and active hydrogen containing groups).

The composite polymer of this invention exhibits good tensile properties and rapid curing as do previously known vinyl-urethane composite polymers. In addition, the impact properties and elongation of the composite polymer of this invnetion are substantially improved as compared to the previously known composite polymers.

DETAILED DESCRIPTION OF THIS INVENTION

The vinyl-urethane composite polymer of this invention comprises the reaction product of (a) a polyahl, (b) a polyisocyanate, (c) a vinyl monomer which has a boiling point above the temperature incurred in reacting said reaction mixture and (d) a vinyl-terminated urethane oligomer as described herein.

The vinyl-terminated urethane oligomer used herein contains at least two internal urethane linkages and at least one terminal polymerizable ethylenically unsaturated group. Advantageously, the oligomer also contains at least 1, preferably about 1 to 2, segments derived from a poly(alkylene oxide) of about 200 to about 4000, preferably 750–3000 equivalent weight.

Suitable such oligomers can be prepared by the reaction of a polyahl, polyisocyanate and a difunctional reactant having ethylenic unsaturation and an active hydrogen-containing group. The ratios of these three components are chosen so that at least a portion of the terminal groups of the oligomers are polymerizable ethylenically unsaturated groups. An excess of polyisocyanate can be employed to provide an oligomer having both isocyanate and vinyl terminal groups. Generally at least 5%, preferably at least 50%, of the terminal groups are polymerizable ethylenically unsaturated groups.

The term "polyahl" is used herein to refer to any compound having at least two active hydrogen atoms. Compounds having such hydrogens include polyols, polyamines, polyacids, polymercaptans and the like. Of these, polyamines and especially polyols are preferred due to their relatively low cost, high availability and generally good properties. It will be noted that when the polyahl is other than a polyol, the oligomer (and composite) will contain linkages such as ureas instead of urethanes. The term "urethane" or "polyurethane" is used broadly herein to cover the entire class of linkages formed in the reaction of a polyisocyanate and an active-hydrogen-containing compound.

In the preparation of the oligomer from a polyahl, polyisocyanate and difunctional reactant, the polyahl is preferably a hydroxyl-terminated poly(alkylene oxide) having a functionality of about 2 to 8, preferably 2 to 3, most preferably about 2 and an equivalent weight of about 200 to 4000, preferably about 500 to 3000, more preferably about 750–3000. The alkylene oxide is advantageously a $C_2$ to $C_6$ alkylene oxide and is preferably ethylene oxide, propylene oxide, butylene oxide or mixtures thereof.

The polyisocyanate preferably has a functionality from about 2 to about 5. The polyisocyanate may be aliphatic or, preferably, aromatic. Suitable aliphatic isocyanates include 1,6-hexamethylenediisocyanate, 1,4-cyclohexanediisocyanate, 1,4,-bis(isocyanatomethyl)cyclohexane, hydrogenated derivatives of aromatic polyisocyanates as described hereinafter, mixtures thereof and the like.

Suitable aromatic polyisocyanates include, for example 2,4-toluene diisocyanate, 2,6-toluene diisocyanate, p,p'-diphenylmethanediisocyanate, p-phenylene diisocyanate, naphthylene diisocyanate, polymethylene polyphenyldiisocyanates, mixtures thereof and the like. Isocyanate-terminated prepolymers or quasiprepolymers, formed by the reaction of a polyahl and a substantial excess of a polyisocyanate are also useful.

The difunctional reactant has polymerizable ethylenic unsaturation and an active hydrogen containing group. The active hydrogen containing group is advantageously —OH, NH, —NH$_2$, —COOH, —SH, and the like with hydroxyl and amine groups being preferred. Exemplary difunctional reactants include, for example, acrylic acid; methacrylic acid; hydroxyalkyl acrylates, especially hydroxyethyl acrylates; hydroxyalkyl methacrylates, especially hydroxyethyl methacrylate; mercaptoalkyl acrylates or methacrylates; aminoalkyl acrylates or methacrylates, especially aminoethyl acrylates; alkenylphenols such as isopropenylphenol; and the like.

In the preparation of the oligomer from a polyahl, polyisocyanate and difunctional reactant, either the polyol or the difunctional reactant may be reacted first with the polyisocyanate. Alternatively, all reactants may be reacted simultaneously. The reaction conditions are generally those known to be useful in preparing polyurethanes; i.e. the reaction is conducted at a temperature from about 0° to 120° C., preferably 20° to 80° C., in the presence of a catalyst for the formation of the urethane linkages as described hereinafter. The reaction is run under conditions such that no substantial addition polymerization of the difunctional reactant occurs. Typically, this is readily achieved by the use of well known vinyl polymerization inhibitors, such as phenothiazine, hydroquinone, t-butyl catechol, monomethylether of hydroquinone, mixtures thereof and the like.

Alternatively, the urethane oligomer can be prepared by reacting an unsaturated isocyanate with a polyahl such as is described hereinbefore. Suitable such polyisocyanates include vinyl isocyanate, isopropenyl isocyanate, isocyanatoethylmethacrylate, allyl isocyanate, allyl isothiocyanate and the like. Such oligomers, and methods for their preparation are described in U.S. Pat. Nos. 4,233,425 to Tefertiller et al and 3,598,866 to Nowak et al. The conditions for this reaction are generally as described with respect to the reaction of polyol, polyisocyanate and difunctional reactants described hereinbefore.

Other suitable urethane oligomers include those described in U.S. Pat. Nos. 3,297,745 and 4,360,653, 4,424,333 and 4,390,662.

The urethane oligomer is employed in the reaction mixture in an amount sufficient to measurably increase the elongation and/or impact strength of the vinyl urethane composite prepared therefrom. In general, such increases are seen when the urethane ologomer comprises about 1–20, preferably 3–12, more preferably 4 to 8 parts by weight of the reaction mixture.

A polyahl is employed in this invention. The polyahl employed herein is a polyfunctional compound having at least two hydrogens which display significant activity according to the Zerewitnoff test described by Woller in the Journal of the American Chemical Society Vol. 49, page 3181 (1927). Typically, the polyahl is a polyol, polyamine, polyamide, polymercaptan, polyacid or a compound containing a mixture of said groups.

A wide variety of suitable polyahls are known to be suitable for preparing polymers by reaction with a polyisocyanate. Suitable polyahls include those listed in columns 3–5 of U.S. Pat. No. 4,394,491. Preferred, however, are the polyols. Examples of such polyols are the polyol polyethers, the polyol polyesters, hydroxy functional acrylic polymers, hydroxyl-containing epoxy resins, polyhydroxy-terminated polyurethane polymers, polyhydroxyl-containing phosphorus compounds and alkylene oxide adducts of polyhydric thioethers including polythioethers, acetals including polyacetals, polyalkylene carbonate polyols, aliphatic and aromatic polyols.

Of these, the polyether polyols are preferred. Such polyether polyols are advantageously prepared by reacting a $C_2$–$C_6$ alkylene oxide, preferably $C_2$–$C_4$ alkylene oxide, more preferably propylene oxide or mixtures thereof with ethylene oxide, with a polyfunctional initiator compound having a plurality of active hydrogen atoms. Preferably, the polyether polyol has a molecular weight from about 200–8000, more preferably about 1000–6000, although mixtures thereof with lower molecular weight polyahls are also useful.

Optionally, a polymer polyahl (copolymer polyahl) can be employed herein as all or part of the required polyahl. Such polymer polyahl comprises a dispersion of discrete polymer particles in a continuous polyahl phase. Preferably, the polymer particles are stabilized by being grafted onto at least a portion of the polyahl molecules. The polyahl may be any polyfunctionalcompound having at least two active hydrogens such as are described more fully hereinbefore.

Advantageously, at least a portion of the polyahl used in the polymer polyahl comprises a compound which contains terminal ethylenic unsaturation which is copolymerizable with the monomers employed to prepare the addition polymer particles. The vinyl-terminated urethane oligomer described hereinbefore is useful for this purpose. Also suitable are mono-adducts of a polyether polyol and an isocyanatoalkyl ester of acrylic or methacrylic acid, as described in U.S. Pat. No. 4,394,491 to Hoffman et al. Advantageously, the polyahl contains from about 0.002 to about 50, preferably about 0.02 to about 5, equivalents of ethylenically unsaturated terminal groups per active hydrogen equivalent.

Preferably, the dispersed polymer particles comprise an addition polymer. The addition polymer particles are prepared by polymerizing at least one ethylenically unsaturated monomer in the presence of said polyahl. The preparation of polmer polyahls is well known in the art and is taught for example in U.S. Pat. Nos. Re. 28,118, Re. 28,715 and U.S. Pat. No. 4,233,425. In general, the polymerization is a thermally-induced free radical polymerization performed in the presence of a free radical-forming catalyst such as benzoyl peroxide, t-butyl perbenzoate, t-butyl peroxide, azobisisobutyronitrile, mixtures thereof and the like. Monomers suitable for such polymerization include, for example, styrene, vinyl naphthylene, t-butyl styrene, divinylbenzene, α-methyl styrene, acrylonitrile, butadiene, vinyl chloride, vinylidene chloride, ethylacrylate, n-, iso-, or sec-butyl acrylate, n-, iso-, or sec-butylmethacrylate, dicyclopentadienemethacrylate, hydroxyethyl acrylate, hydroxyethyl methacrylate, methyl acrylate, methyl methacrylate and the like. Such monomers are polymerized in situ in the polyol to form polymer particles dispersed within or, in preferred embodiments, grafted to the continuous polyol phase. Preferably the dispersed polymer particles are "soft" particles, i.e. have a $T_g$ of about 25° C. or lower, preferably lower than 0° C. and more preferably lower than −20° C.

Also useful herein are polymer polyahls having dispersed polyurethane particles as are described in U.S. Pat. No. 4,347,209 to Rowlands.

The use of a polymer polyahl herein often provides further improvement in elongation and impact strength while generally maintaining the other desirable properties of the vinyl urethane composite polymer. In general, the polymer polyahl is employed in an amount such that such further improvement is seen. In addition, the polymer particles of the polymer polyahl can replace a portion of the urethane oligomer herein. Typically, the combined weight of the urethane oligomer and the addition polymer particles of the polymer polyahl comprises from about 1 to about 20, preferably from about 3 to 12, more preferably from about 4 to 8 percent by weight of the combined weight of all reactive components employed in preparing the vinyl urethane composite. In addition, of the combined weight of the urethane oligomer and polymer particles contained in the polymer polyahl, about 5 to about 90, preferably about 25 to 75 percent comprises the urethane oligomer.

It is noted that when a polymer polyahl is used, there are provided two types of soft segments in the composite, i.e. the dispersed particles of the polymer polyahl and the urethane oligomer. Such segments may have significantly different thermal properties, i.e. different $T_g$'s, the range of use of the composite of the invention may often be significantly broadened.

The polyisocyanate employed herein is advantageously as described with respect to the preparation of the urethane oligomer from a polyahl, polyisocyanate and difunctional reactant. The amount of polyisocyanate employed is such that the reaction mixture contains an isocyanate index of about 90-150. The isocyanate index is 100 times the number ratio of isocyanate groups to active hydrogens in the reaction mixture. In calculating the isocyanate index, any unreacted isocyanate groups in the urethane oligomer are included.

The addition polymerizable monomer employed herein is one which has a boiling point above the temperatures encountered in the polymerization of the reaction mixture to form the vinyl urethane composite. Preferably, the addition polymerizable monomer has an atmospheric boiling point of at least 70° C., and more preferably at least 100° C. Lower boiling monomers tend to volatilize during the reaction of the reaction mixture, forming cells or voids in the product vinyl urethane composite. The monomer also preferably contains no groups which are reactive with isocyanates. Suitable monomers include, for example, styrene, divinylbenzene, 2-ethylhexylacrylate, butyl acrylate, t-butyl styrene, trimethylolpropane trimethacrylate, 1,3-butylene glycol dimethacrylate, vinyltoluene, chlorostyrene, methyl methacrylate, butyl methacrylate, vinyl naphthalene, vinylcyclohexane, vinylbenzoate, acrylonitrile, vinyl sulfone, mixtures thereof and the like. Liquid monomers are preferred, but solid monomers can be used if dissolved in another monomer or other components present in the reaction mixture.

The vinyl monomer advantageously comprises about 15 to 75% by weight of the reaction mixture, preferably about 20 to 60% by weight thereof.

The polymerization of the reactants is advantageously carried out under condition such that the polyahls and isocyanates react more or less simultaneously with the reaction of the vinyl reactant(s). The general conditions described in U.S. Pat. No. 4,125,497 are suitable herein. In general, a polymerization temperature from about 0° to 180° C., preferably from 20° to 120° C. is employed. Typically, the reaction is carried out in the presence of a catalyst for the reaction of the isocyanate and active hydrogen-containing compounds as well as one for the polymerization of the vinyl monomers. The conventional urethane catalysts are useful as catalysts herein. Preferred are organolead catalysts such as lead salts of carboxylic acids having from about 2 to about 20 carbon atoms, including, for example, lead octoate, lead oleate, lead naphthenate and mixtures thereof and the like. Also preferred are cobalt, vanadium and copper catalysts as described in U.S. Pat. No. 4,125,487. Catalysts for polymerizing the ethylenically unsaturated monomers include those described hereinbefore in conjunction with the preparation of the polymer polyahl.

Due to the presence of the urethane oligomer (and polymer polyahl, if present), it is not generally necessary to employ a diluent or reaction modifier to form the vinyl urethane composite polymer of this invention. However, in cases wherein a highly exothermic reaction is obtained, or it is necessary to disperse the heat of reaction, a diluent or reaction modifier may be employed herein. Such diluent or reaction modifier is most commonly required when the heat of reaction is so great that one or more of the components of the reaction mixture undesirably volatilizes or degrades during the polymerization reaction. Suitable diluents are described in U.S. Pat. No. 4,125,487 and include, for example, organic liquids having a boiling point of at least 150° C., granular solids having a surface area of less than about 0.8 m²/g, and addition polymers having a grease melt index from about 1 to about 250 grams per minute as determined with a 0.02 inch orifice employing a total weight of 2160 grams at 80° C., a solubility parameter of at least about 8 and a specific heat of at least about 0.35 calories/g/°C. The diluent or reaction modifier, when required, is employed in an amount that the exotherm from the urethane-forming reaction is controlled such that substantially no undesirable volatilization or degradation of the components of the reaction mixture occurs, but in an amount less than that which inhibits the polymerization of the addition polymerizable reactants, or causes a deleterious effect on the properties of the finished urethane vinyl composite.

Various optional components may be employed herein. For example, if a cellular composite is desired, a blowing agent such as water or a low boiling halogenated organic compound, such as chloroform, trichloroethane, methylene chloride, trichlorofluoromethane, dichlorodifluoromethane and the like may be employed herein. Other useful blowing agents include substances which thermally decompose to form carbon dioxide or water vapor under the reaction condition such as magnesium sulfate heptahydrate, sodium carbonate decahydrate, sodium phosphate dodecahydrate, calcium nitrate tetrahydrate, ammonium carbonate tetrahydrate, and the like.

In addition, surfactants, i.e. cell size control agents, antioxidants, pigments, inorganic fillers, dyes, chain transfer agents, and other commonly employed additives may be employed herein for their usual purposes.

The shaping or forming of the vinyl urethane composites of this invention may be accomplished by pouring the reactants into molds made of substances such as polyethylene, polypropylene, polyethylene terephthalate, silicone elastomers, metals such as aluminum, copper or alloys such as brass or stainless steel. The mold must be such that it can withstand the heat generated by the polymerizing mass and also must be nonreactive with and insoluble in the reactants. To prevent the reacting mass from adhering to the mold surface, it may be necessary to precoat the mold surface with a film of an external mold release such as a hydrocarbon wax, a polysilicone preparation or a polytetrafluoroethylene coating. Alternatively, one may employ an internal mold release in the composition.

The reactants may be introduced individually into the mold but preferably are introduced into the mold in as few streams as possible. Preferably, the reactants are placed in the mold in two streams, one of which contains the polyahl and catalyst and the second of which contains the remainder of the reactants. Alternatively, three streams can be used, one containing the polyahl and free radical initiator, a second containing the urethane oligomer, copolymer polyahl (if any) ethylenically unsaturated monomers and urethane catalyst, and the third containing the polyisocyanate. The reaction mixture is suitable for processing in reaction injection molding (RIM) processes as well as conventional coating processes. Exemplary RIM processes are described in Ludwice and Taylor, The Bayflex 110 Series—The New Generation of RIM Materials, presented at the Society of Automotive Engineers Passenger Car meeting, Detroit Mich., Sept. 26-30, 1977, British Pat. No. 1,534,258, and Sweeney, Introduction to Reaction Injection Molding, Technomics, Inc. 1979.

In conducting the reaction via RIM or conventional casting processes an elevated temperature, i.e. 60°-100° C., preferably 70°-95° C. is advantageously used to effectuate the polymerization reactions. Significantly lower temperatures do not provide an economical rate of reaction, whereas higher temperatures often cause the reaction to proceed too rapidly, or cause the degradation or undesirable volatilization of components in the reaction mixture.

The composite polymer of this invention is useful in preparing shaped elastomeric materials such as furniture components, piping elements, machine components, structural members and the like.

The following examples are provide to illustrate the invention and are not intended to limit the scope thereof. All parts and percentages are by weight unless otherwise indicated.

EXAMPLE 1

A. Preparation of a Monovinyl-Terminated Urethane Oligomer

To a glass reactor containing a nitrogen atmosphere, 0.59 g phenothiazine and 139 grams (0.80 mole) of toluene diisocyanate (80/20 blend of 2,4- and 2,6-isomers) are added. Over a two minute period are then added 0.5 g stannous octoate and 0.5 g of an organotin catalyst dissolved in 803 g (0.397 mole) of a 2025 MW polypropylene glycol. Three minutes following this addition, the exotherm from the reaction mixture raises the temperature in the reactor to 55° C. The reaction mixture is then heated to 65° C. for 2 hours until all of the polypropylene glycol has reacted. Then, 47 grams (0.406 mole) of 2-hydroxyethyl acrylate are added over a 13 minute period. The reaction mixture is then heated to 75° C. for 2 hours. The resulting urethane oligomer is a pale yellow liquid having the following statistical structure:

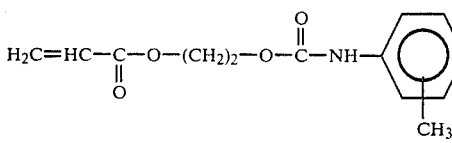

B. Preparation of Copolymer Polyol

To a glass reactor are added 420 grams of a 2000 molecular weight polypropylene glycol, 10 parts per million of a monomethyl ether of hydroquinone and about 2 drops of dibutyltin dilaurate catalyst. This mixture is heated to 70° C. and 6.5 g isocyanatomethylmethacrylate is added to the reactor. This reaction is heated at 70° C. for 2 hours at which time a vinyl terminated adduct having the following structure is obtained:

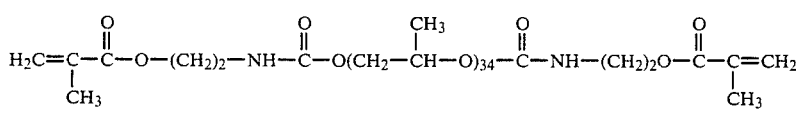

The reactor is purged with nitrogen and a mixture of 345 grams of n-butylacrylate and 115 grams of acrylonitrile, and a mixture of 661 grams of a 2000 molecular weight polypropylene glycol and 9 grams of azobisisobutyronitrile are simultaneously added dropwise to the reactor over a period of one hour. The reaction temperature is increased to 100° C. during the initial 5 minutes of the addition of these reactants. After all reactants are added, the temperature is maintained at 100° C. for 2 more hours. The product as recovered is an opaque mixture of particles with a hydroxyl equivalent weight of about 1500.

C. Preparation of Urethane Vinyl Composite

In a beaker are mixed 12.3 grams of the urethane oligomer from Example 1-A, 12.3 grams of the copolymer polyol from Example 1-B, 60.1 grams of vinyl toluene, 43.5 grams of a 260 molecular weight polypropylene oxide triol, 1.5 grams of a 24 percent active lead octoate solution, 0.4 grams of t-butyl peroctoate and 0.15 grams of a 12 percent active cobalt naphthenate solution. To a second beaker is added 73.5 grams of a 143 equivalent weight liquid 4,4'-methylenediphenyl-diisocyanate. The contents of the two beakers are combined and mixed for 15 seconds. After mixing, the solution is poured into the ⅛" cavity of an insulated, preheated (90° C.) metal mold. Curing is allowed to progress for 4 minutes. The casting is then removed from the mold as a rigid part. The mechanical properties of tensile and flexural test pieces are determined on an Instron machine using standard methods (ASTM D-638 and D-790). The 264 psi heat distortion temperature is determined using ASTM D-648. The volume impact strength is determined using ASTM D-256. The Gardner impact strength is determined using ASTM D-329. The results are as reported in Table I following.

TABLE I

| | |
|---|---|
| Tensile Strength (psi) | 6236 |
| Elongation (%) | 37 |
| Flexural Modulus (psi) | 272,270 |
| Unnotched Izod Impact Strength (ft-lb/in) | 0.75 |
| Gardner Impact Strength (in-lb) | 38 |
| Heat Distortion Temperature (°F.) | 180 |
| Specific Gravity (g/cc) | 1.1477 |

EXAMPLE 2

A. Preparation of a Divinyl-Terminated Urethane Oligomer

To a 3 liter kettle fitted with a reflux condenser, stirrer and nitrogen inlet are added 419 grams ( 2.408 moles) of toluene diisocyanate (80/20 mixture of 2,4-and 2,6 isomers) and 1.56 grams of phenylthiazine.

To the kettle are than added, in three equal portions over a period of 27 minutes, a mixture of 1.7 grams of stannous octoate catalyst, 1.7 grams of an organotin catalyst and 2431 grams (1.20 moles) of a 2025 molecular weight polypropylene glycol. Upon completion of the addition of polypropylene glycol and catalysts, the reaction temperature has increased to 58° C. The reaction mixture is then heated to 65° C. for 2 hours, at which time complete reaction of the polypropylene glycol is observed. Then, 281 grams (2423 moles) of 2-hydroxyethylacrylate are added over a period of 27 minutes. The reaction mixture is then heated at 75° C. for 2 hours. The product urethane oligomer has the following statistical structure:

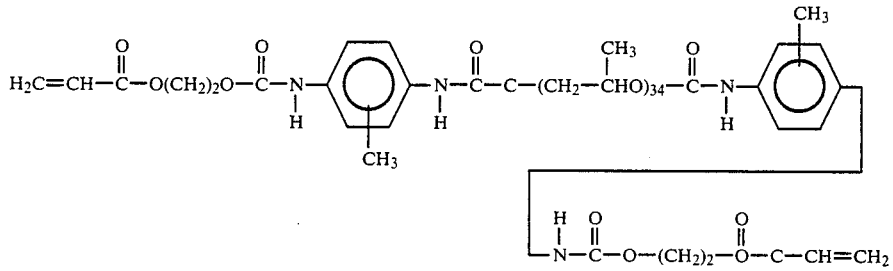

B. Preparation of Vinyl Urethane Polymer

The procedure of Example 1-C is repeated except that the vinyl urethane oligomer from Example 2-A is substituted for that previously employed. The properties of the resultant vinyl urethane composite are as indicated in Table II following.

TABLE II

| Tensile Strength (psi) | 5968 |
| Elongation (%) | 22 |
| Flexural Modulus (psi) | 273,868 |
| Unnotched Izod Impact Strength (ft-lb/in) | 0.67 |
| Gardner Impact Strength (in-lb) | 42 |
| Specific Gravity (g/cc) | 1.1462 |

EXAMPLE 3

A. Preparation of Copolymer Polyol

To a 2 liter glass reactor are added 1596 grams of a 3000 molecular weight polypropylene oxide/ethylene oxide copolymer triol, 247 grams of isocyanatoethyl methacrylate, 131 grams n-butyl acrylate, 44 grams acrylonitrile and 1 gram of azobisisobutyronitrile. The reactants are heated under a nitrogen atmosphere at 100° C. for 6 hours. A 465 gram portion of the resulting liquid copolymer solution is added to a separate 2 liter glass reactor and heated to 85° C. Then, under a nitrogen atmosphere, are simultaneously added over a period of 45 minutes, a mixture of 315 grams n-butylacrylate and 105 grams acrylonitrile, and a mixture of 661 grams of a 3000 molecular weight propylene oxide/ethylene oxide copolymer triol and 9.20 grams azobisisobutyronitrile. Upon completion of the additions, the reation mixture is heated at 95° C. for 10 hours. The resulting product is an opaque mixture of particles having a hydroxyl equivalent weight of 1428.

B. Preparation of Vinyl-Urethane Composite

In a beaker are mixed 10.3 grams of the urethane oligomer obtained in Example 1-A, 20.5 grams of the copolymer polyol obtained in Example 3-A, 40.9 grams of a 260 molecular weight polypropylene oxide triol 60.1 g vinyl toluene, 1.5 g of a 24% active lead octoate solution, 0.4 g t-butyl peroctoate and 0.15 g of a 12% active cobalt naphthenate solution. To this mixture is added 69.9 g of a 143 equivalent weight liquid 4,4'-methyl diphenyldiisocyanate. After mixing for 15 seconds, a ⅛" casting is prepared and tested as described in Example 1-C. The results of the testing are as reported in Table III.

TABLE III

| Tensile Strength (psi) | 5,136 |
| Elongation (%) | 50 |
| Flexural Modulus (psi) | 213,798 |
| Unnotched Izod Impact Strength (ft-lb/in) | 0.84 |
| Gardner Impact Strength (in-lb) | 48 |
| Heat distortion temperature (°F.) | 142 |
| Specific Gravity (g/cc) | 1.1438 |

EXAMPLE 4

A 10 g portion of the urethane oligomer of Example 2-A is mixed with 44.2 grams of a 260 molecular weight polypropylene oxide triol, 20 g of a 2000 molecular weight polypropylene oxide diol, 60 g vinyl toluene, 1.2 grams of an organolead catalyst, 0.6 g t-butyl perbenzoate, and 0.3 g of a 12% active cobalt naphthenate solution. To the resulting mixture are added 76.4 g of a 143.0 equivalent weight liquid 4,4'-MDI. After stirring for 15 seconds, the solution is poured into a ⅛" deep metal mold which has been preheated to 90° C. After curing for 4 minutes at 90° C., the casting is removed from the mold. The properties of this molding are indicated as Sample No. 4-A in Table IV following.

Sample No. 4-B is prepared in like manner, substituting 1.0 g t-butyl peroctoate for the t-butyl perbenzoate used in preparing Sample No. 4-A, and decreasing the amount of cobalt naphthenate to 0.13 g. The properties of this sample are also reported in Table IV.

TABLE IV

| | Sample No. 4-A | Sample No. 4-B |
| --- | --- | --- |
| Tensile Strength (psi) | 5,252 | 5,527 |
| Elongation (%) | 54 | 80 |
| Flexural Modulus (psi) | 221,800 | 196,185 |
| Unnotched Izod Impact Strength (ft-lb/in) | 0.86 | 0.98 |
| Gardner Impact Strength (in-lb) | 80 | 92 |
| Heat distortion temperature (°F.) | 158 | 170 |
| Specific Gravity (g/cc) | 1.1474 | 1.1433 |

EXAMPLE 5

A 12.3 g portion of a urethane oligomer prepared as described in Example 1-A is mixed with 46.7 g of a 260 molecular weight poly(propylene oxide) triol, 4.1 g of a 2000 molecular weight poly(propylene oxide) diol, 60.1 g vinyl toluene, 1.5 g of a 24% active organolead solution, 0.4 g t-butyl perbenzoate and 0.15 g of a 12% active cobalt naphthenate solution. To this mixture is added 78.5 g of a 143.0 equivalent weight liquid 4,4' MDI. After mixing for about 15 seconds, a casting is prepared as described in Example 4. The casting has physical properties as indicated as Sample No. 5-A in Table V.

This experiment is repeated, increasing the amounts of 260 molecular weight triol to 49.2 g and the MDI to 82.1 g, decreasing the amount of the urethane oligomer to 10.2 g and eliminating the 2000 molecular weight diol. The casting (Sample No. 5-B) has properties as indicated in Table V.

TABLE V

|  | Sample No. 5-A | Sample No. 5-B |
| --- | --- | --- |
| Tensile Strength (psi) | 6,483 | 7,440 |
| Elongation (%) | 32 | 28 |
| Flexural Modulus (psi) | 273,047 | 311,995 |
| Unnotched Izod Impact Strength (ft-lb/in) | 0.56 | 0.53 |
| Gardner Impact Strength (in-lb) | 52 | 52 |
| Heat distortion temperature (°F.) | 132 | 145 |
| Specific Gravity (g/cc) | 1.1509 | 1.1592 |

EXAMPLE 6

Equal portion (12.3 g each) of the urethane oligomers prepared as described in Examples 1-A and 2-A are mixed with 44 g of a 260 molecular weight poly (propylene oxide) triol, 60.1 g vinyl toluene, 1.5 g of a 24% active organotin catalyst, 0.4 g t-butyl perbenzoate and 0.15 g of a 12% active cobalt naphthenate solution. To this mixture is added 73 g of a 143 equivalent weight liquid MDI, and a casting is prepared as described in Example 4. The properties of the casting are reported in Table VI.

TABLE VI

| Tensile Strength (psi) | 4,977 |
| --- | --- |
| Elongation (%) | 26 |
| Flexural Modulus (psi) | 243,443 |
| Unnotched Izod Impact Strength (ft-lb/in) | 0.48 |
| Gardner Impact Strength (in-lb) | 40 |
| Heat Distortion Temperature (°F.) | 133 |
| Specific Gravity (g/cc) | 1.1502 |

EXAMPLE 7

A. Preparation of Vinyl Terminated Urethane Oligomer

In a reactor are heated to 60° C. 348.3 g (2.0 moles) of an 80/20 mixture of 2,4- and 2,6-toluene diisocyanate. To the reactor are then added over a 1.5 hour period a mixture of 260.1 g (2.0 moles) 2-hydroxypropyl acrylate and 7.13 g stannous octoate. After heating at 60° C. for an additional 2 hours to complete the reaction, 2000 g (0.667 mole) of a 3000 molecular weight difunctional copolymer of propylene oxide and ethylene oxide are added over a 30 minute period. Following this addition, the mixture is heated at 60° C. for another 3.5 hours to complete the reaction. The resulting urethane oligomer is a viscous pale yellow liquid.

B. Preparation of Vinyl-Urethane Composite Polymer

A 13 g portion of the urethane oligomer prepared according to Example 7-A is mixed with 52.9 g of a 260 molecular weight poly(propylene oxide) triol, 2.0 g of a 2000 molecular weight poly (propylene oxide) diol, 60.1 g vinyl toluene, 1.0 g of a 24% active lead octoate, 0.4 g t-butyl perbenzoate, and 0.5 g of a 12% active cobalt naphthenate solution. To this mixture is added 87.1 g of a 143 equivalent weight liquid MDI and a casting is prepared according to the process described in Example 4. The Gardner impact strength of the casting is 56 in-lb.

EXAMPLE 8

A vinyl urethane composite is prepared by a reaction injection molding process from the following formulation.

|  | Parts |
| --- | --- |
| "B-side" |  |
| Polypropylene oxide triol (2000 MW) | 20.5 |
| Polypropylene oxide triol (255 MW) | 44.8 |
| Urethane oligomer from Example 2A | 10.0 |
| Vinyl toluene | 60.0 |
| Silicone surfactant | 1.0 |
| Cobalt naphthenate (12% active) | 0.133 |
| Lead catalyst (24% active) | 1.2 |
| "A-side" |  |
| 143.0 equivalent weight liquid- MDI | 77.51 |
| t-butyl peroctoate (50% active) | 2.0 |

The "A" and "B" sides are separately blended and heated to 75° F. Each is then delivered through a reaction injection molding machine at a pressure of 762 psi (1 lb/sec throughput) to a preheated (183°-193° F.) metal mold which has been pretreated with an external mold release. After six minutes curing time in the mold, the molding is removed. The properties of the molding are as indicated in Table 7 following.

TABLE VII

| Flexural Modulus (psi) | 271,900 |
| --- | --- |
| Flexural Strength (psi) | 13,075 |
| Heat distortion temperature (°F.) | 142 |
| Notched.Izod Impact Strength (in-lb/in) | 2.5 |
| Specific Gravity (g/cc) | 1.15 |

COMPARATIVE EXAMPLE A

Experiment 7B is repeated, this time eliminating the urethane oligomer and the 2000 molecular weight diol. The properties of this casting are reported in Table A following.

TABLE A

| Tensile Strength (psi) | 10,600 |
| --- | --- |
| Elongation (%) | 15.5 |
| Flexural Modulus (psi) | 439,265 |
| Unnotched Izod Impact Strength (ft-lb/in) | 0.6 |
| Gardner Impact Strength (in-lb) | 22 |
| Heat Distortion Temperature (°F.) | 175 |
| Specific Gravity (g/cc) | 1.1582 |

In comparing these properties with those Examples of this invention, it is readily seen that the use of the urethane oligomer in preparing the vinyl urethane composite substantially increases the elongation and Gardner Impact Strength. In addition, the tensile and flexural properties of the composite of this invention, while reduced somewhat compared to the Comparative Example, easily meet normal end use requirements.

EXAMPLE 9

A foamed vinyl-urethane composite is prepared in this example. In a suitable container are stirred together 40 g of a 255 average molecular weight poly(propylene oxide) triol, 18.1 g of a 2000 molecular weight poly(propylene oxide) diol, 50 g vinyl toluene, 9.1 g of a urethane oligomer as described in Example 2-A, 1.4 g of a surfactant, 0.11 g of 12% active cobalt naphthenate and 1.1 g of a 24% active lead catalyst. This mixture is heated to 133° F.

In a separate container are mixed 69.3 g of methane diphenyldiisocyanate, 0.9 g t-butyl peroctoate and 9.0 g 1,1,1-trichloroethane. This mixture is heated to 75° F.

The respective mixtures are injected into a ¼" deep metal mold which is preheated to about 180° F. After complete reaction and foaming, the product exhibited a heat distortion temperature (264 psi) at 155° F., a Gardner Impact Strength of about 50 ft-lb and a density of 0.84 g/cc.

We claim:

1. A vinyl urethane composite polymer comprising the reaction product of a reaction mixture comprising
   (a) from about 1 to about 20 percent by weight of the mixture of a vinyl-terminated urethane oligomer containing at least one segment derived from a poly(alkylene oxide) polyol having an equivalent weight of about 200–4000,
   (b) from about 15 to 75 percent by weight of the mixture of a vinyl monomer having a boiling point above the temperature incurred in reacting said reaction mixture,
   (c) a polyisocyanate in an amount sufficient to provide to the mixture from about 0.9 to about 1.5 isocyanate groups per active hydrogen atom contained therein, and
   (d) a polyahl, provided that when said polyahl comprises a polymer polyahl containing dispersed soft polymer particles, the combined weight of said dispersed soft polymer particles and said vinyl-terminated oligomer is from about 1 to about 20 percent by weight of the mixture, and the vinyl-terminated urethane oligomer comprises about 5 to about 90 percent of the combined weight of the vinyl-terminated urethane oligomer and the dispersed soft polymer particles.

2. The composite of Claim 1 wherein the urethane oligomer is the reaction product of a polyol, a polyisocyanate and a difunctional reactant containing an active hydrogen-containing group and an addition polymerizable group.

3. The composite of Claim 1 wherein the urethane oligomer is the reaction product of a polyol and an unsaturated isocyanate.

4. The composite of Claim 1 wherein at least a portion of the polyahl comprises a polymer polyahl.

5. The composite of Claim 4 wherein the polymer polyahl comprises a polyether polyol having a molecular weight of about 200–8000 and a plurality of addition polymer particles dispersed therein.

6. The composite of Claim 5 wherein the dispersed polymer particles have a $T_g$ of lower than 0° C.

7. The composite of Claim 6 wherein the addition polymer particles are grafted onto a portion of the polyahl which contains terminal ethylenic unsaturation.

8. The composite of Claim 7 wherein the vinyl monomer comprises styrene, vinyl toluene, vinyl naphthylene, chlorostyrene, t-butyl styrene, α-methyl styrene, acrylonitrile, 2-ethylhexyl acrylate, 2-ethylhexylmethacrylate, divinyl benzene or mixtures thereof.

9. The composite of Claim 1 wherein the reaction mixture further comprises a free-radical initiator and catalyst for the reaction of a polyisocyanate and a polyahl.

10. The composite of Claim 9 wherein the catalyst for the reaction of a polyisocyanate and a polyahl comprises a lead, tin, cobalt, vanadium or copper catalyst.

11. The composite of Claim 1 wherein the urethane oligomer contains at least one terminal vinyl group and at least one terminal isocyanate group.

12. The composition of Claim 1 wherein the urethane oligomer contains at least one segment derived from a poly(alkylene oxide) polyol having an equivalent weight of about 750–3000.

* * * * *